3,051,470
PNEUMATIC SUSPENSION FOR VEHICLES
Georges Boulet, Toulouse, France, assignor to Société à Responsabilité Limitée: Recherches Etudes Production R.E.P., Paris, France, a corporation of France
Filed Nov. 4, 1959, Ser. No. 850,832
Claims priority, application France Nov. 15, 1958
3 Claims. (Cl. 267—64)

In U.S. Patent No. 2,901,243 of August 25, 1959, there was described a vehicular pneumatic suspension designed so that its frequency of oscillation is substantially constant, irrespective of the amplitude of said oscillation and also independent of the initial load.

The suspension which is described is characterized in that it comprises a chamber having a volume variable as a function of the load and two series of auxiliary chambers. For a given static load of the vehicle, one of the said series of auxiliary chambers is in communication with the variable volume chamber while the other series of chambers does not communicate therewith. All of these variable and non-variable volume chambers contain an unvarying mass of gas and means are provided so that when the capacity of the variable volume chamber falls below the volume of reference corresponding to the static load of the vehicle, the auxiliary chambers of the second series are successively put into communication with the said variable volume chamber, while the chambers of the first series remain in communication with the said variable volume chamber. When the capacity of the variable volume chamber rises above the volume of reference, the auxiliary chambers of the second series remain closed while those of the second series close in succession.

A form is described in which the variable volume chamber is a chamber of cylindrical shape while the constant volume chambers were laterally disposed with respect to the cylinder and put into communication or out of communication with the said cylinder by the displacement of a movable piston in the said cylinder.

The present invention relates to a device for the practical application of the invention referred to above. It is of particularly simple design and of small overall dimensions and is therefore wholly suitable for a pneumatic suspension of vehicles.

It is characterized in that the variable volume chamber is a container having one wall formed by an elastic diaphragm stretched over a body inside which are arranged the constant volume chambers, and in that the orifices which cause the said constant volume chambers to communicate with the variable volume-chamber which surrounds these latter are disposed successively over the surface of the said body in such manner that the elastic deformation of the said diaphragm unmasks a series of orifices or closes another series of orifices according to whether the volume of the variable volume chamber falls below or rises above a position of reference, this position of reference being that which corresponds to the static charge only of the suspension.

A form of embodiment of the present invention is described below by way of example and not in any sense by way of limitation and is illustrated by the accompanying drawings in which.

Figure 1:
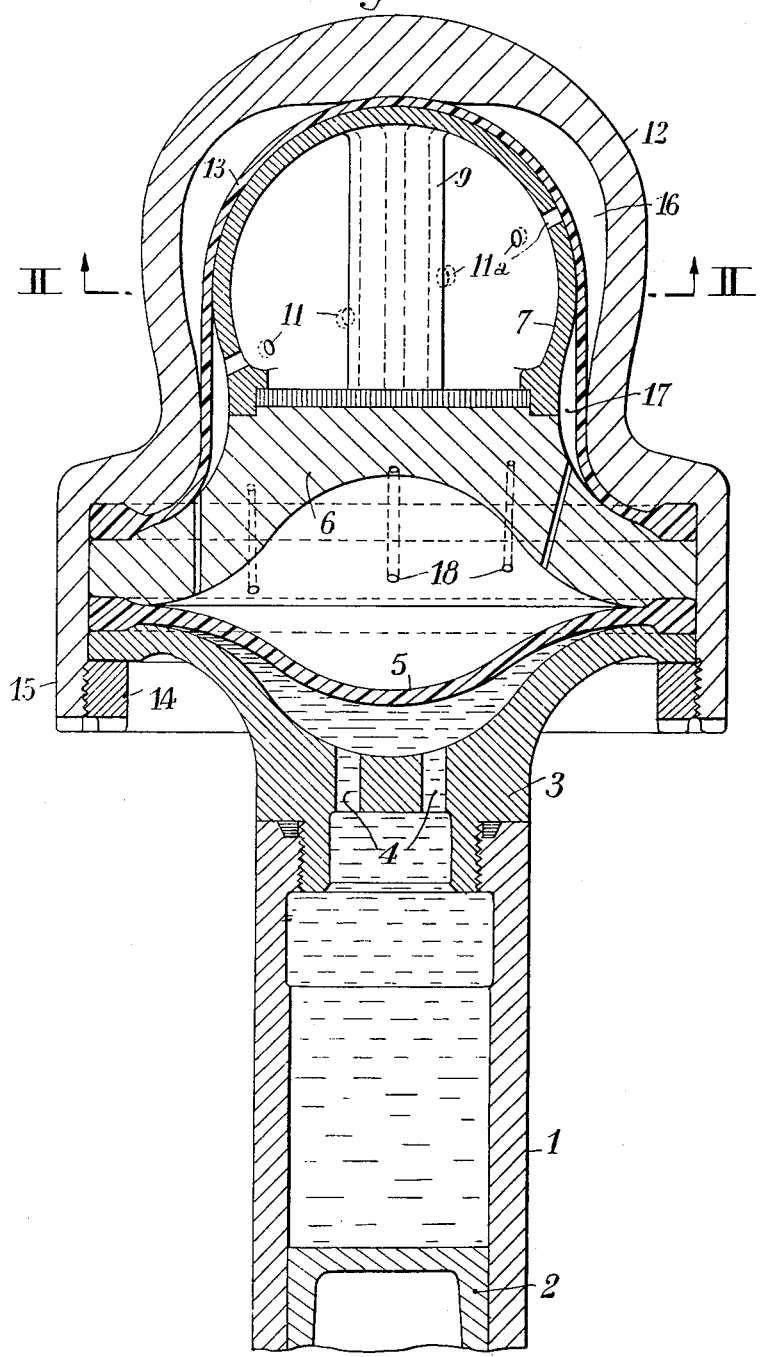
FIG. 1 is a longitudinal cross-section taken along the line I—I of FIG. 2.
Figure 2:
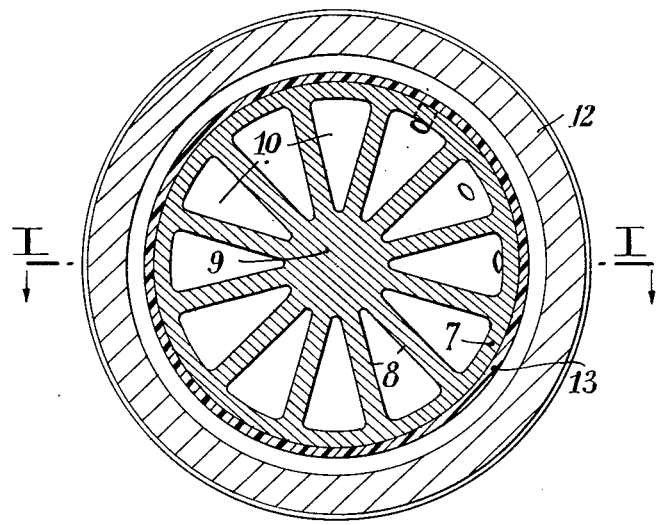
FIG. 2 is a transverse cross-section taken along the line II—II of FIG. 1.

In these figures, 1 is a cylindrical chamber in which there is a moving piston 2. The cylinder 1 is extended by a flared member 3 forming a kind of cup with which it communicates through passages 4. An elastic diaphragm 5 which bears on the periphery of the cup closes this latter in a fluid-tight manner. The chamber which extends from the piston 2 up to the diaphragm 5 is filled with a liquid such as oil, for example. The elastic material which constitutes the diaphragm is therefore chosen from those materials which cannot be attacked by the said liquid. Above the diaphragm is disposed a member 6 in the shape of a bell, the edge of which bears on that of the diaphragm such that the diaphragm forms a fluid-tight joint between the bell member 6 and the flared member 3. The member 6 defines a chamber with the diaphragm 5. The bell 6 is surmounted by a hollow body 7 having the shape of a portion of a sphere, through which pass radial walls 8. These latter form, together with an axial core 9, spaces for a plurality of constant volume cells or compartments 10, each of which communicates exteriorly of the body 7 through a passage 11. The external orifices of these passages are arranged successively in relation to the axis of symmetry of the hollow body 7. The body 7 is covered by a cap 12. The said cap bears on an elastic diaphragm 13 and stretches the said diaphragm over the spherical body. A ring 14, which rests on the edge of the flared member 3 is screwed into the skirt 15 of the cap 12, and insures the fluid-tightness of the joints formed by the edges of the two diaphragms. On each side of the elastic diaphragm 13 are formed two annular spaces 16 and 17 located one above the other. Passages 18 cause the chamber defined by bell 6 and diaphragm 5 to communicate with the annular space 17. The passages 11 are spaced apart in the direction of the axis of the core 9. The volume between the bell 6 and the diaphragm 5, the annular spaces 16 and 17 as well as the cells 10 are filled with a mass of inert gas such as nitrogen, for example, pre-determined so that the pressure of the said gas balances the static load supported by the device. The chamber defined between the diaphragm 5 and the bell 6, the system of passages 18 and the annular space 17 constitute in their combined form the variable volume chamber as defined in the above numbered patent, while the cells 10 constitute the constant volume chambers.

In the case of an application relating to a suspension of an automobile vehicle, a unit of the type described will be employed for each wheel, the piston 2 being rigidly fixed to the axle while the cap 12, or the cylindrical body 1, is rigidly fixed to the suspended portion of the vehicle. In this case, the mass of gas will be pre-determined so that the floor of the vehicle remains at a pre-determined height, under the mean static load for which it is intended, while a known hydraulic device for restoring the level can be provided so as to maintain this level at a constant height under different static loads. When in motion the floor is intended to oscillate above and below this level according to the unevenness of the road surface. It is assumed that this position of reference is that of FIG. 1, in which a certain number of cells 10 are in communication with the space 17 through the orifices 11 while the other cells are separated from the said chamber by the diaphragm 13 which is stretched over the orifices 11a of the said cells. The method of operation of the device may now be readily understood.

Assuming that the piston 2 is driven into the cylinder 1, the diaphragm 5 is forced back by the liquid to reduce the volume of the bell 6. This causes an increase of pressure of the gas in the chamber defined by diaphragm 5, bell 6 and diaphragm 13 which increases the volume of the annular space 17 caused by expansion of the elastic diaphragm 13. This latter uncovers one or a number of successive orifices 11 which successively cause a number of other cells 10 to communicate with the annular space 17. On the other hand, if the piston moves in reverse direction starting from the position of reference, the diaphragm 5 is deformed in the reverse direction, the volume of the bell increases and the existing pressure falls in the bell as well as in the annular space 17. The difference of pressures which exist in the annular spaces 16 and 17 applies the diaphragm against one portion of the orifices 11 which were previously open, while those orifices which were closed remain closed.

The principle of the present invention of the above numbered patent is thus always effectively adhered to and, by means of the device described, it is also possible to produce a monochronous or substantially monochronous suspension, that is to say a suspension in which frequency of oscillation is constant and independent of oscillation magnitude and which provides the best conditions of comfort for the passengers of an automobile vehicle.

It will be observed that the passages 18 which open beneath the bell 6 are also staggered in height. This has for its object the closing of the said passages successively in such manner as to stiffen the suspension, as may be required, towards the end of the largest amplitudes of movement in the direction of the compression, in the case of particularly violent shocks.

In the apparatus described above, the body containing the constant volume cells, the elastic diaphragm which masks and unmasks the orifices and the cap which rests on the said diaphragm can very easily be separated from the suspension members which cause the volume of the variable volume chamber to vary. They can therefore be housed in any suitable emplacement and coupled by means of a piping system to the said members, the position of which is coupled to the position of the axles.

What we claim is:

1. A suspension comprising first and second members defining a space; a first elastic diaphragm sealably engaged between said members defining first and second chambers in said space, a cylindrical body coupled to one of the members and communicating with said first chamber, a piston displaceable in said cylindrical body to exert pressure in said first chamber, a liquid enclosed between the piston and the diaphragm, a hollow body on the other of said members, said hollow body including in part a spherical surface, said hollow body being provided with a plurailty of compartments and an orifice for each of said compartments opening externally of said body, the orifices being spaced longitudinally along said hollow body, a hollow cap over said hollow body and the other of said members and defining a space therewith, a second elastic diaphragm in the latter said space and sealably engaged between said hollow body and said hollow cap, said second elastic diaphragm being stretched over said spherical surface of the hollow body and dividing said latter space into two annular spaces, said other member being provided with a plurality of passages providing fluid communication between said second chamber and one of the annular spaces; a gas in the second chamber, said one annular space, said compartments and said passages; said gas providing a predetermined position of the piston in the cylinder such that at least one of the orifices is exposed, the other of the orifices being closed by the second diaphragm.

2. A suspension as claimed in claim 1 comprising a plurality of radial walls in said hollow body to define said compartments, said hollow body having an axis, said radial walls defining planes passing through the axis of said hollow body.

3. A suspension as claimed in claim 1 wherein the passages between the second chamber and said one annular space are staggered to open into the second chamber at different elevations therein.

References Cited in the file of this patent

UNITED STATES PATENTS 2,370,942    Dick _____ Mar. 6, 1945

FOREIGN PATENTS 1,100,585    France _____ Apr. 6, 1955